US011080352B2

(12) United States Patent
Ma et al.

(10) Patent No.: US 11,080,352 B2
(45) Date of Patent: Aug. 3, 2021

(54) SYSTEMS AND METHODS FOR MAINTAINING DATA PRIVACY IN A SHARED DETECTION MODEL SYSTEM

(71) Applicant: International Business Machines Corporation, Armonk, NY (US)

(72) Inventors: Yi-Hui Ma, Mechanicsburg, PA (US); Willie R. Patten, Jr., Hurdle Mills, NC (US); Eugene I. Kelton, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/577,745

(22) Filed: Sep. 20, 2019

(65) Prior Publication Data

US 2021/0089604 A1 Mar. 25, 2021

(51) Int. Cl.
*G06F 16/00* (2019.01)
*G06F 16/9536* (2019.01)
(Continued)

(52) U.S. Cl.
CPC .... *G06F 16/9536* (2019.01); *G06F 16/90335* (2019.01); *G06F 16/957* (2019.01); *G06Q 30/0629* (2013.01)

(58) Field of Classification Search
CPC .................................................. G06F 16/957
See application file for complete search history.

(56) References Cited

U.S. PATENT DOCUMENTS 5,819,226 A 10/1998 Gopinathan et al.
8,014,597 B1 9/2011 Newman
(Continued)

FOREIGN PATENT DOCUMENTS

CN 106610854 A 5/2017
CN 107229966 A 10/2017
(Continued)

OTHER PUBLICATIONS

International Search Report and Written Opinion dated Dec. 24, 2020 in related International Patent Application No. PCT/IB2020/058556.
(Continued)

*Primary Examiner* — Ajith Jacob
(74) *Attorney, Agent, or Firm* — Troutman Pepper Hamilton Sanders LLP

(57) ABSTRACT

A local node for updating detection models while maintaining data privacy has an aggregation module, a retraining module, an instructions module, and a sharing module. The aggregation module aggregates the data into features that describe the contents of the data. The retraining module retrains the detection model using the features by implementing an algorithm that includes at least one selected feature and a threshold for triggering an activity alert. The instructions module determines instructions for calculating the at least one selected feature from a different collection of data. The sharing module generates a package having the instructions for calculating the at least one selected feature from the different collection of data and the threshold, and transmits the package to a local node for implementation of the retrained detection model with data stored at the local node.

25 Claims, 10 Drawing Sheets

(51) Int. Cl.
*G06F 16/903* (2019.01)
*G06Q 30/06* (2012.01)
*G06F 16/957* (2019.01)

(56) References Cited

U.S. PATENT DOCUMENTS

| | | | |
|---|---|---|---|
| 8,935,788 | B1 | 1/2015 | Diao |
| 9,508,075 | B2 | 11/2016 | Geckle et al. |
| 9,576,262 | B2 | 2/2017 | Ganguly et al. |
| 2004/0255167 | A1 | 4/2004 | Knight |
| 2008/0306872 | A1* | 12/2008 | Felsher ............ G06Q 20/367 705/51 |
| 2013/0103372 | A1 | 4/2013 | Hogg et al. |
| 2015/0326591 | A1 | 11/2015 | Bernard et al. |
| 2016/0294614 | A1 | 10/2016 | Searle et al. |
| 2017/0063896 | A1 | 3/2017 | Muddu et al. |
| 2017/0148027 | A1 | 5/2017 | Yu et al. |
| 2018/0018590 | A1 | 1/2018 | Szeto et al. |
| 2018/0025286 | A1 | 1/2018 | Gorelik et al. |
| 2019/0260784 | A1* | 8/2019 | Stockdale ........... H04L 63/1441 |

FOREIGN PATENT DOCUMENTS

| | | |
|---|---|---|
| CN | 107564522 A | 1/2018 |
| CN | 108170695 A | 6/2018 |
| CN | 108241561 A | 7/2018 |
| CN | 108345794 A | 7/2018 |
| CN | 108921301 A | 11/2018 |
| CN | 109978177 A | 7/2019 |
| WO | 2014160296 A1 | 10/2014 |
| WO | 2017091443 A1 | 6/2017 |
| WO | 2018213205 A1 | 11/2018 |
| WO | 2019075399 A1 | 4/2019 |

OTHER PUBLICATIONS

International Search Report and Written Opinion dated Dec. 24, 2020 in related International Patent Application No. PCT/IB2020/058559.
International Search Report and Written Opinion dated Dec. 24, 2020 in related International Patent Application No. PCT/IB2020/058564.
Edge, Michael, et al., "Towards a Proactive Fraud Management Framework for Financial Data Streams," Third IEEE International Symposium on Dependable, Autonomic and Secure Computing, IEEE Computer Society, 2007, pp. 55-62.
Henke, Márcia, et al., "Analysis of the Evolution of Features in Classification Problems with Concept Drift: Application to Spam Detection," 2015 IFIP/IEEE International Symposium on Integrated Network Management (IM), IEEE, 2015.
Yao, Danfeng, et al., "Anomaly Detection as a Service: Challenges, Advances, and Opportunities," Synthesis Lectures on Information Security, Privacy, and Trust, Oct. 2017, 173 pages.
Vanhaesebrouck, Paul, et al., "Decentralized Collaborative Learning of Personalized Models over Networks," International Conference on Artificial Intelligence and Statistics (AISTATS), Apr. 2017.
Non-Final Office Action dated May 14, 2021 in related U.S. Appl. No. 16/577,774.
Non-Final Office Action dated May 20, 2021 in related U.S. Appl. No. 16/577,770.

* cited by examiner

SYSTEMS AND METHODS FOR MAINTAINING DATA PRIVACY IN A SHARED DETECTION MODEL SYSTEM

TECHNICAL FIELD

The present application generally relates to systems for systems for updating analytical models, and, in particular, systems and methods for maintaining data privacy in a shared detection model system.

BACKGROUND

Analytical models for event detection are important to a range of fields and industries. For example, various analytical models are used to detect banking fraud, aid in regulatory compliance, and many other complex, data-driven problems. Many fields require the most up-to-date models for accurate and timely event detection. In some fields, for example, many types of fraud, a third party is agent is actively working to escape detection by current analytical models. Thus, what is needed is a system for updating detection models that allows a model update to be distributed, analyzed, and implemented in a rapid fashion over multiple local nodes of the system. Moreover, due to the usefulness of larger and more diverse data sets, there are incentives to share information, such as detection models and data for model generation, across multiple entity systems. However, especially due to the sensitivity of the data being shared, data privacy must be considered and taken into account.

SUMMARY

According to some embodiments, the present disclosure describes a computer-implemented method for updating a detection model while maintaining data protection in a data processing system. The method includes aggregating a collection of data into features that describe the contents of the data, generating a detection model using the features by implementing an algorithm that includes at least one selected feature and a threshold for triggering an activity alert, determining instructions for calculating the at least one selected feature from a different collection of data, generating a package having the instructions for calculating the at least one selected feature from the different collection of data and the threshold, transmitting the package to a local node for implementation of the detection model with data stored at the local node.

According to some embodiments, the present disclosure additionally describes a local node including a processing device and a memory including instructions which are executed by the processing device for retraining a model based on a data set comprising data. The local node also includes an aggregation module configured to aggregate the data into features that describe the contents of the data, a retraining module configured to retrain a detection model using the features by implementing an algorithm that includes at least one selected feature and a threshold for triggering an activity alert, an instructions module configured to determine instructions for calculating the at least one selected feature from a different collection of data, and a sharing module configured to generate a package having the instructions for calculating the at least one selected feature from the different collection of data and the threshold. The sharing module is further configured to transmit the package to a local node for implementation of the retrained detection model with data stored at the local node.

According to some embodiments, the present disclosure also describes a computer-implemented method for updating a detection model while maintaining data protection in a data processing system. The method includes receiving features from a plurality of local nodes, the features being aggregated data that describe the contents of the data relevant to a respective local node, generating a detection model based on the received features from the plurality of local nodes, the detection model comprising a threshold for comparing to at least one selected feature or combination of features and triggering an activity alert, determining instructions for calculating the at least one selected feature or combination of features from a different collection of data, generating a package having the instructions for calculating the at least one selected feature from the different collection of data and the threshold, and transmitting the package to each of the plurality of local nodes for implementation of the detection model with data stored at the local node.

According to some embodiments, the present disclosure further describes a detection model system including a processing device and a memory including instructions which are executed by the processing device for retraining a detection model. The detection model system also includes a data control module configured to receive features from at least one local node, the features being aggregated data that describe the contents of the data relevant to a respective local node, a model manager configured to generate a detection model based on the received features from the plurality of local nodes, the detection model comprising a threshold for comparing to at least one selected feature or combination of features and triggering an activity alert, and a privacy manager configured to determine instructions for calculating the at least one selected feature or combination of features from a different collection of data. The model manager is configured to generate a package having the instructions for calculating the at least one selected feature from the different collection of data and the threshold, and transmit the package to each of the plurality of local nodes for implementation of the detection model with data stored at the local node.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF ILLUSTRATIVE EMBODIMENTS

Figure 1:
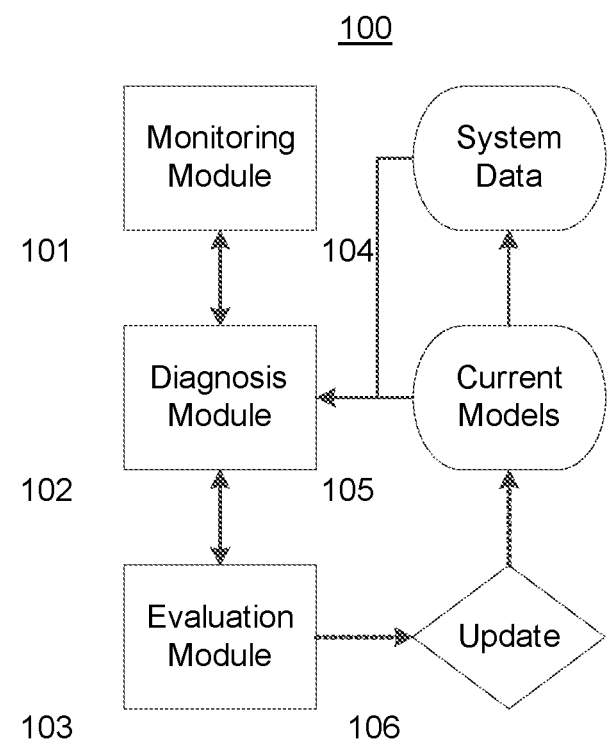
FIG. 1 depicts a block diagram of an exemplary update system comprising a single local node.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice, memorization and recall)

Predict and sense with situation awareness that mimic human cognition based on experiences Answer questions based on natural language and specific evidence Embodiments herein relate to a system for updating analytical models across multiple local nodes. As used herein, an individual "local node" refers to software installed by an end user, such as an individual person or a corporation. In some embodiments the local node comprises one computer system. In some embodiments, the local node comprises multiple computer systems or servers controlled by the end user. In some embodiments, each local node in the system uses a set of current analytical models that are specific to that local node. In some embodiments, each local node in the system accesses and analyzes system data produced by one or more analytical models. This system data is specific to each local node, and may comprise sensitive or confidential information.

As used herein, an individual "analytical model," or just "model" is a software algorithm designed to detect certain events using data analysis techniques. In some embodiments, the analytical models detect data anomalies. In some embodiments, the analytical models detect fraud events. In some embodiments, the data analysis techniques used by the analytical models include, but are not limited to, data preprocessing techniques, calculation of one or more statistical parameters, statistical ratios based on classifications or groups, calculation of probabilities, classification techniques such as data clustering and data matching, regression analysis, and gap analysis. In some embodiments, the software of the local node comprises one or more analytical models. In some embodiments, the software of the local node comprises one or more analytical models and deterministic rules. In some embodiments, the software of the local node comprises one or more analytical models for fraud detection. In some embodiments, the software of the local node comprises one or more analytical models for regulatory compliance or non-compliance. In some embodiments, the software of the local node comprises one or more models and deterministic rules for fraud detection. In some embodiments, the software of the local node comprises one or more models and deterministic rules for regulatory compliance or non-compliance.

In some embodiments, the update system receives one or more model updates and pushes those updates to applicable local nodes. In some embodiments, the update system pushes updates to all local nodes in the system. In some embodiments, the update system pushes updates to only selected local nodes. In some embodiments, the update system determines which local nodes receive the model update push.

In some embodiments, each individual local node that receives a model update checks that update against the current models of an analytical system, and, if applicable, the update system will update the current models. In some embodiments, the update system receives one or more manually created model updates. In some embodiments, the update system receives one or more model updates created by a local node of the update system. In some embodiments, the local nodes of the update system are connected by a central hub or module that itself is not a local node. In some embodiments, the local modes of the update system are connected directly to each other, for example, as a decentralized network.

In some embodiments, the update system, including any local nodes, is a stand-alone system that creates and pushes model updates for any software system that uses analysis models. In some embodiments, the update system is itself a component or subsystem of a larger analytical system, for example, an analytical system for fraud detection.

FIG. 1 depicts a block diagram representation of components, outputs and data flows of an exemplary single local node of an update system 100. The local node comprises three main modules, or subsystems: a monitoring module 101, a diagnosis module 102, and an evaluation module 103.

The monitoring module 101 monitors one or more factors to determine if a model update process is required. In some embodiments, the monitoring module 101 checks the time since the last update process and initiates an update process if enough time has passed. In some embodiments, the monitoring module 101 initiates an update process if 6 hours, 12 hours, 1 day, 2 days, 3 days, 4 days, 5 days, 6 days, 7 days, 10 days, 15 days, 30 days, 1 month, 2 months, 3 months, 6 months, or 1 year has passed since the last update process. In some embodiments, the monitoring module 101 initiates an update process if it receives a model update pushed from a source external to the local node 100. For example, the monitoring module 101 can receive a model update pushed from a central module of the update system, another local node, or directly from an update system administrator.

In some embodiments, the monitoring module 101 can initiate an update process if signaled by the diagnosis module 102. In some embodiments, the diagnosis module 102 analyzes system data 104 and can signal the monitoring module 101 to initiate an update process if one or more data thresholds have been met. For example, the diagnosis module 102 can signal the monitoring module 101 if the diagnosis module's analysis of the system data 104 shows an increase in event detection above a data threshold value or a decrease in event detection below a data threshold value. In some embodiments, the data threshold value can be manually set, for example, by an end user. In some embodiments, the data threshold value can be automatically determined by the diagnosis module 102, for example, if the event detection rate increases by a significant value over the one week running average detection rate.

When an update process has been initiated, the monitoring module 101 will query for available model updates. In some embodiments, the monitoring module 101 will query a central module of the update system, another local node, or an update system administrator. In some embodiments, if the update process was initiated by a model update pushed from a source external to the local node 100, then the monitoring module 101 will not query for additional available model updates. In some embodiments, if the update process was initiated by a model update pushed from a source external to the local node 100, the monitoring module 101 will still query for additional available model updates.

When the monitoring module 101 has completed all available queries and has received at least one model update, the monitoring module 101 will pass the model update to the diagnosis module 102. The diagnosis module 102 will compare the model update to a database of current models 105 available in the local node. In some embodiments, the diagnosis module 102 will categorize the model update to current models 105, whether those current models 105 are actively in use or not. In some embodiments the diagnosis module 102 will categorize the model update to the system data 104 generated by the application of the active current models 105.

When the diagnosis module 102 has received the model update and at least compared the model update to the database of current models 105, the diagnosis module 102 will pass the model update and all available comparison and other analytical data to the evaluation module 103. The evaluation module 103 will evaluate the model update to determine if the update 106 should be applied. In some embodiments, the evaluation module 103 will automatically apply the model update, changing or modify the current models 105 with the model update. In some embodiments, the evaluation module 103 will analyze the model update to determine if such a model already exists in the current model database 105. In some embodiments, the evaluation module 103 will run the model update against relevant system data 104 or relevant categorical data generated by the diagnosis module 102 to determine if the model update will provide the local node 100 with different system data than what the current models 105 can generate. In some embodiments, the evaluation module 103 will not automatically apply any updates or perform any analysis unless authorized by an end user or administrator of the local node 100.

Figure 2:
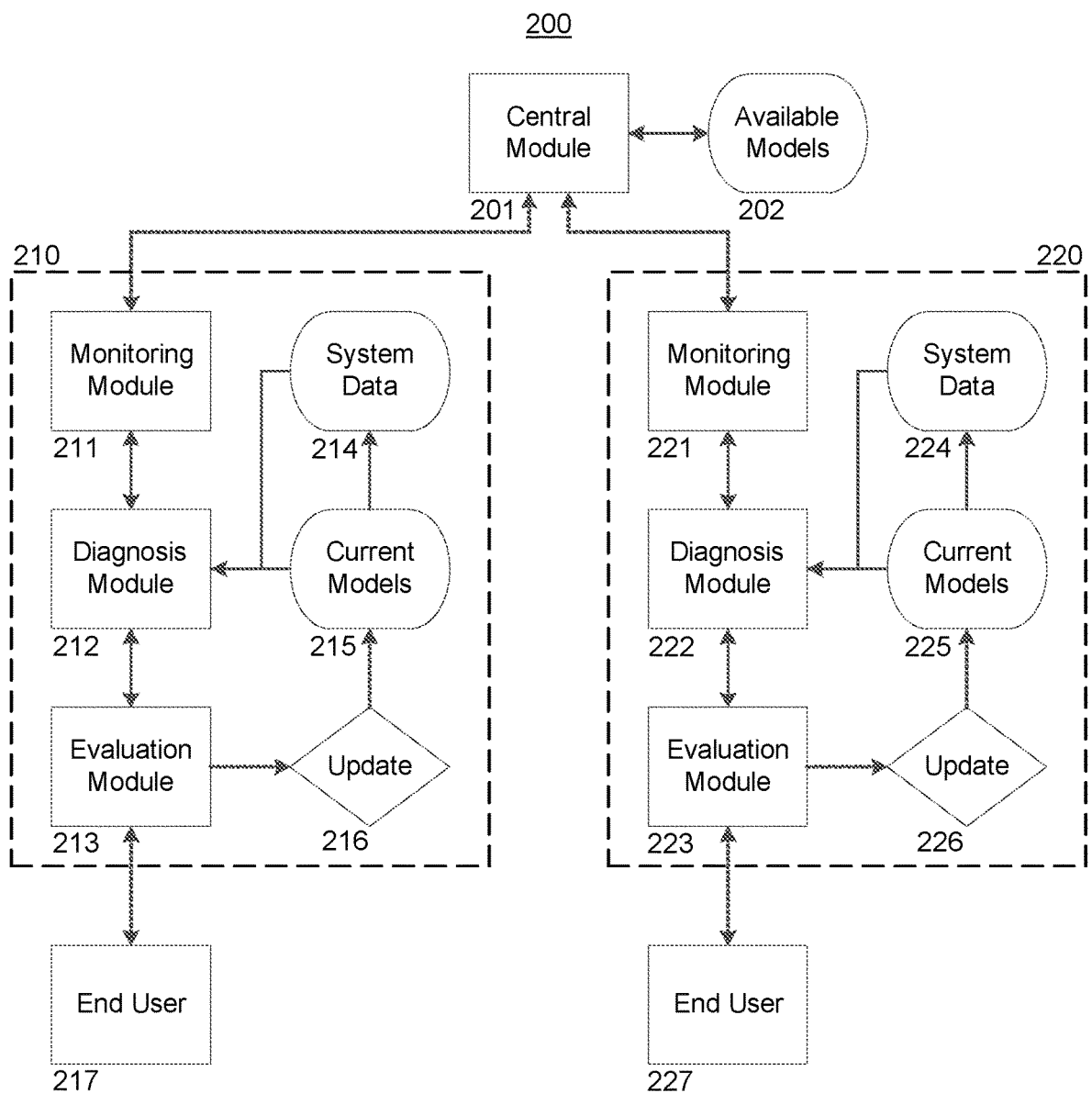
FIG. 2 depicts a block diagram of an exemplary update system comprising multiple local nodes connected by central module.

FIG. 2 depicts a block diagram representation components, outputs and data flows of an update system with multiple local nodes 200. The update system comprises a central module 201 that connects all local nodes in the update system 200. FIG. 2 depicts two local nodes, generally categorized as 210 and 220. In some embodiments, there is no limit to the number of local nodes that could be present in the update system 200. It should be appreciated that local nodes 210 and 220 are generally the same as the local node described in FIG. 1, with each comprising a monitoring module 211, 221, a diagnosis module 212, 222, and an evaluation module 213, 223. Each local node further comprises its own system data 214, 224 and database of current models 215, 225. It should be appreciated that each local node may have different system data and current models. In some embodiments, the system data 214 may or may not be identical or similar to system data 224. In some embodiments, the current models 215 may or may not be identical or similar to the current models 225.

The central module 201 does not exist in any local node, but rather in a separate location, such as a centralized administration server. In some embodiments, the central module 201 can send and receive information from monitoring modules 211, 221. In some embodiments, the central module 201 can send and receive information from any monitoring module in the update system. The central module 201 can access a master database of available models 202 to the update system. The database of available models 202 is a listing of all possible analytical models that currently exist in the update system. In some embodiments, a database of current models in an individual node, for example the current models 215, is equivalent to the dataset of available models 202. In some embodiments, a database of current models in an individual node, for example the current models 215, is not equivalent to the dataset of available models 202, but contains at least one model in common with the database of available models 202.

In some embodiments, when a monitoring module in an individual node, for example the monitoring module 211, initiates a query for available model updates, the monitoring module will electronically communicate with the central module 201.

In some embodiments, each individual node can communicate with one or more end users. In FIG. 2 for example, the evaluation module 213 of node 210 can communicate with end user 217. In some embodiments, any module of an individual node can communicate with an end user. In some embodiments, an individual node communicates with an end user to provide the end user with information regarding the update process. In some embodiments, an individual node communicates with an end user to provide the end user with information regarding the results of an update, for example, which models were updated. In some embodiments, an individual node communicates with an end user to ask the end user for authorization prior to updating any models.

Figure 3:
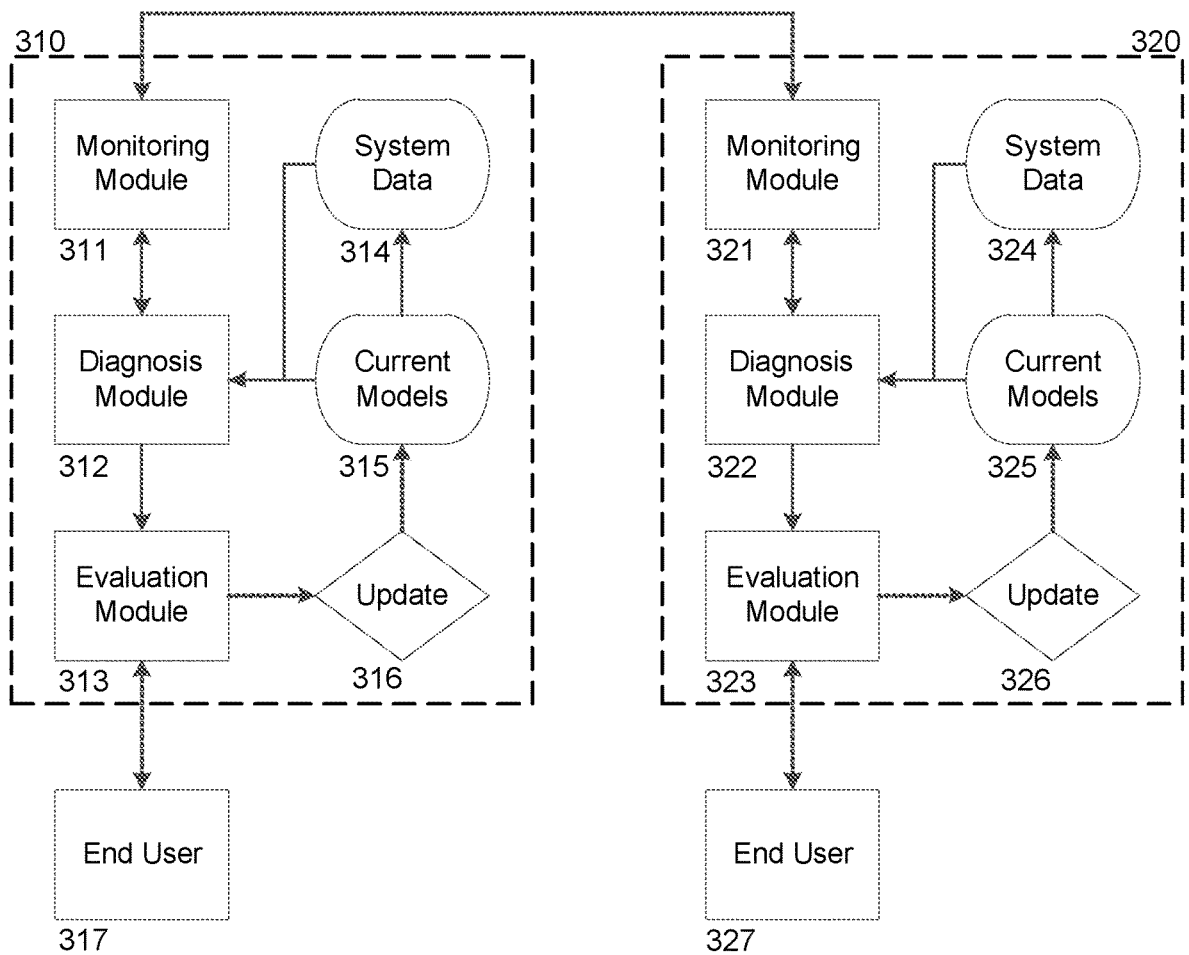
FIG. 3 depicts a block diagram of an exemplary update system comprising multiple, directly-connected local nodes.

FIG. 3 depicts another block diagram representation of components, outputs and data flows of an update system with multiple local nodes 300. The update system 300 depicts two local nodes, generally categorized as 310 and 320. In some embodiments, there is no limit to the number of local nodes that could be present in the update system 300. It should be appreciated that local nodes 310 and 320 are generally the same as the local nodes described in FIGS. 1 and 2, with each comprising a monitoring module 311, 321, a diagnosis module 312, 322, and an evaluation module 313, 323. Each local node further comprises its own system data 314, 324 and database of current models 315, 325. It should be appreciated that each local node may have different system data and current models. In some embodiments, the system data 314 may or may not be identical or similar to system data 324. In some embodiments, the current models 315 may or may not be identical or similar to the current models 325.

Unlike FIG. 2, the update system 300 does not have any type of central module that connects all of the local nodes. Instead, each local node is directly connected to each other via a network. In some embodiments, each monitoring module is in electronic communication with every other monitoring module in the update system 300. For example, as depicted in FIG. 3, the monitoring module 311 is in electronic communication with monitoring module 321.

In some embodiments, when an update process has been initiated in an individual node, the monitoring module of that node will query another local node in the update system 300. For example, when an update process has been initiated in local node 310, the monitoring module 311 will query monitoring module 321 of local node 320. In some embodiments, when an update process has been initiated in an individual node, the monitoring module of that node will query all other local nodes in the update system 300. In some embodiments, when an update process has been initiated in an individual node, the monitoring module of that node will query only selected other nodes in the update system 300. In some embodiments, when an update process has been initiated in an individual node, the monitoring module of that node will query only one other node in the update system 300.

In any embodiment herein, a system administrator can create an updated model and manually add it to the update system. For example, a system administrator can create an updated model and submit that model to the central module 201 as depicted in FIG. 2. As another example, a system administrator can create an updated model and submit that model to the monitoring module 321 as depicted in FIG. 3. In some embodiments, when an updated model has been added to any update system depicted herein, update process may be initiated throughout all of some of the nodes in the update system.

In any embodiment herein, any local node of an update system can originate a model update and automatically push it to the rest of the update system. In some embodiments, local nodes generating their own model updates is advantageous because it allows the update system to quickly respond to increases in fraud detection without end user or administrator involvement. For example, the diagnosis module 212 as depicted in FIG. 2 analyzes system data 214 and detects an increase in fraud detection greater than a pre-set threshold. The diagnosis module 212 proceeds to list the model or models that were used to detect the increase in fraud, and analyze the system data 214 to determine the critical features and conditions of the nexus between the model or models and the data. The diagnosis module 212 then strips the model of any specific data to the system data 214 and the local node 210. The monitoring module 211 then sends the model to the central module 201, which would then determine if the model is applicable as a model update for the update system 200.

In any embodiment where a local node is originating a model update for the update system, it is important that the specific system data of that local node is not shared with any central hub or other local node in the update system. In some embodiments, the diagnosis module creating the model to be shared with the update system creates a new model that is independent of any specific system data from the local node. In some embodiments, the new model comprises one or more of the following: one or more algorithms, create date and time, number of events detected over given time period, metadata or high level aggregate statistics such as total transactional value of time, and the threshold point or points used to trigger the update. In some embodiments, the new model comprises ratio statistics of one or more data group averages. In some embodiments, the new model can detect deviation from the ratio statistics of one or more data group averages to determine future positive results. In some embodiments, the new model comprises one or more network or image graphics that represent one or more models. In some embodiments, the new model comprises one or more network or image graphics that represent the new model.

In any of the embodiment herein, the components of the update system can be stored in the same location, for example, as installed software in an internal server system at a company, such as a bank. In some embodiments, some of the components of any update system disclosed herein are stored in different locations, such as part of a cloud-based service.

Figure 4:
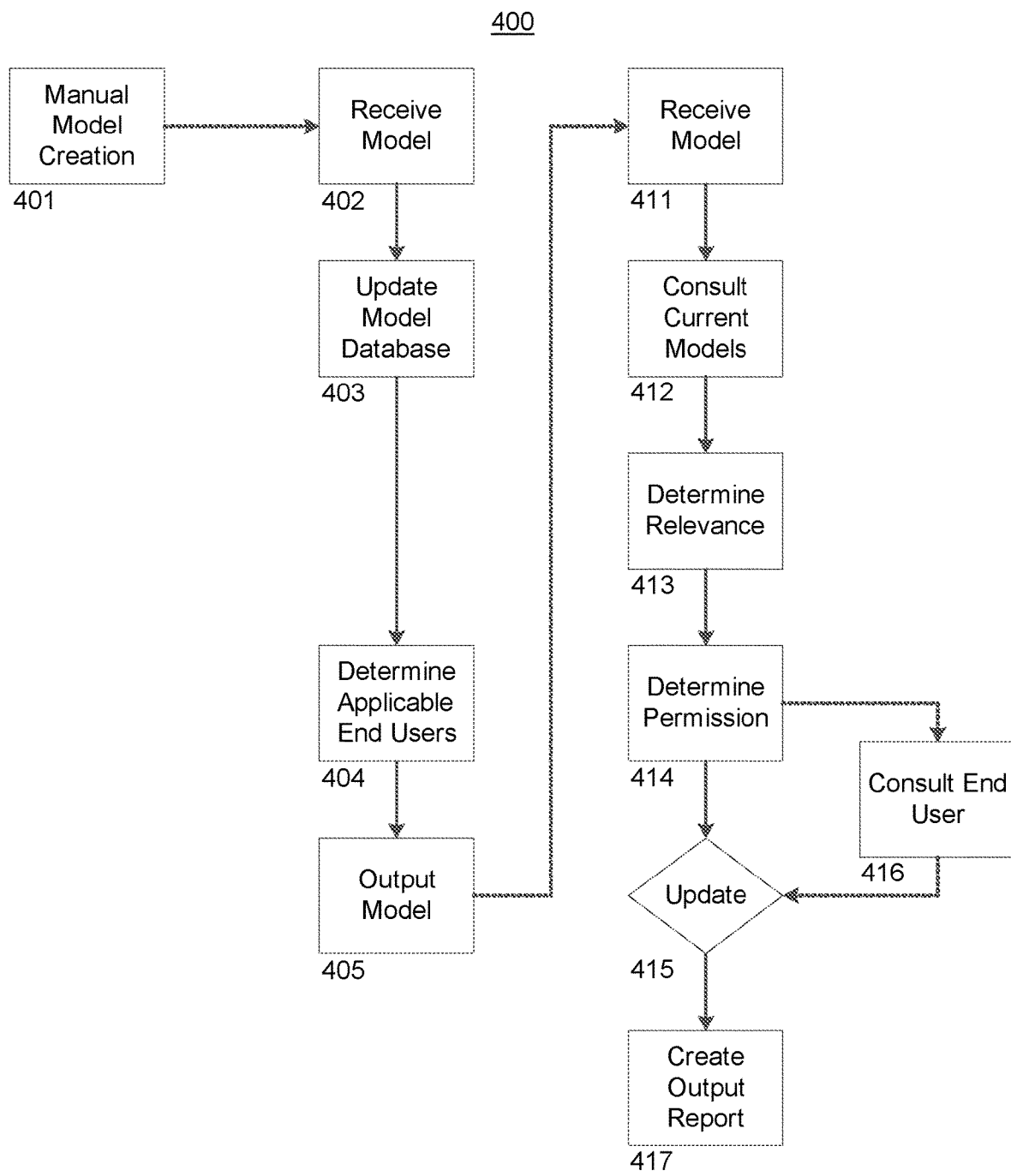
FIG. 4 depicts a flow chart of an exemplary method of updating analytical systems using an update system and a manually created model update.

FIG. 4 depicts a flow chart of an exemplary method of using a manually created model to push a model update in an update system with a central module 400. In some embodiments, method 400 can be used with the update system depicted in FIG. 2. First, a system administrator manually created a new model that will be used to update the system 401. In some embodiments, the new model comprises a new or updated algorithm or algorithms. In some embodiments, the new model comprises information on what criteria is necessary for the new model's use, for example, the type of business, the amount of system data required, or type of detection performed by the model. In some embodiments, the new model comprises priority information on how critical the model is to the update system. For example, a new model that must be pushed out to all local nodes would be given the highest possible priority. In some embodiments, priority information is categorized as either low priority, medium priority, or high priority.

Next, the new model created by the system administrator is pushed to the update system, which receives the model 402. In some embodiments, a central module of an update system receives the model. Upon receiving the model 402, the central module then updates the model database 403. For example, the central module 201 would update the available models database 202 in update system 200 depicted in FIG. 2.

The update system would then determine the applicable end users for the new model 404. In some embodiments, the central module is determining which end users are applicable. In some embodiments, the central module determines which end users are applicable for the model update by comparing criteria information in the new model with information on each end user in addition to the priority information of the new model. For example, if the model update for credit card fraud detection has a medium priority, the central module will identify which local nodes in the update system are involved with credit card fraud detection and then push out the model 405 to those identified local nodes. The model update would not be pushed out to any remaining local nodes, however, when each of those remaining local nodes initiates an update process, for example, if enough time has gone by without an update to trigger the monitoring module, that local node may then receive the update. In another example, if the model update for credit card fraud detection has a high priority, the central module will output the model 405 to all local nodes. In another example, if the model update for credit card fraud detection has a low priority, the central module will not push out the model to any local node right away, and instead wait for each local node to initiate an update process on its own.

Once the model update has been sent out from the central module, it is received 411 by at least one local node. In some embodiments, the model update is received by multiple local nodes simultaneously. In some embodiments, the model update is received by the monitoring module in any of the embodiments described herein.

In some embodiments, once a local node has received a model update 411, it is not installed automatically. First, the local node will consult the current model database to see if the model update will replace any existing models 412. Then the local node will determine the relevance of the model update to the node 413. For example, in local node 210 of update system 200 depicted in FIG. 2, the model update is received by the monitoring module 211, and then passed along to the diagnosis module 212. The diagnosis module 212 first consults the current model database 215 and then determines the relevance of the model update to local node 210. In some embodiments, the diagnosis module 212 will end the update process after the determine relevance step 413. In some embodiments, the diagnosis module 212 will end the update process after the determine relevance step 413 if the diagnosis module 212 determines that the model update is not needed for the local node. In some embodiments, the diagnosis module 212 will end the update process after the determine relevance step 413 if the diagnosis module 212 determines that the model update is already present in the local node. In some embodiments, the diagnosis module 212 will automatically bypass the determine relevance step 413 if the model update carries a high priority.

In some embodiments, once the local node has determined that the model update would be relevant or necessary, the local node will determine if it has permission to apply the model update 414. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 416. For example, once the diagnosis module 212 has either determined that the model update is relevant or that the model update has a high enough priority to bypass the determine relevance step 413, the model update is passed along to the evaluation module 213. The evaluation module 213 then checks the update permission settings of the local node. In some embodiments, if the evaluation module 213 determines that it does not have permission to install the model update, the evaluation module 213 will end the update process. In some embodiments, the evaluation module 213 will consult an end user, for example, by issuing a user prompt or by sending an e-mail or other communication to the end user, before installing the model update.

The local node will install the model update once the local node determines that it has permission to do so 415. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation module 213 updates the current model database 215 with the model update.

In some embodiments, once the update 415 is complete, the local node creates an output report 417. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

Figure 5:
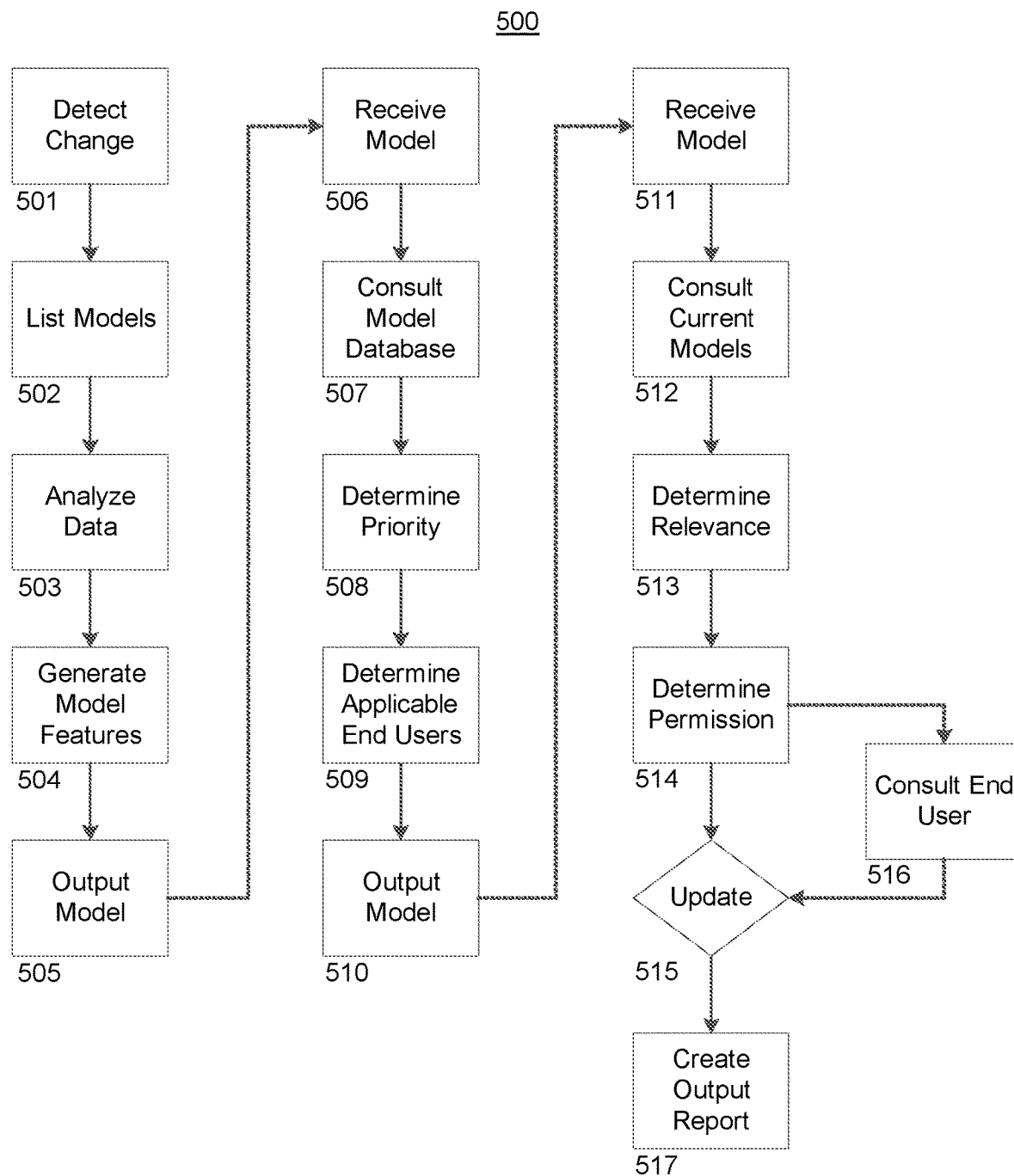
FIG. 5 depicts a flow chart of an exemplary method of updating analytical systems using a model update created by one of the local nodes; wherein the local nodes are connected by a central module.

FIG. 5 depicts a flow chart of an exemplary method of pushing a model update in an update system with a central module, where the model update was created automatically from a local node in the update system 500. In some embodiments, method 500 can be used with the update system depicted in FIG. 2. First, a local node in an update system will detect a change in the results from their existing models 501. In some embodiments, a local node in an update system will detect a change in fraud detection rates. In some embodiments, the change in fraud detection rates is an increase in fraud detection greater than a pre-set threshold. In some embodiments, the change in fraud detection rates is a significant increase or decrease in fraud over a given period of time. In some embodiments, a local node in an update system will detect a change in detected fraud magnitude. In some embodiments, the change in fraud magnitude is an increase in the value or dollar amount of a detected fraud event greater than a pre-set threshold. In some embodiments, the change in fraud magnitude is a significant increase in the value or dollar amount of a detected fraud event compared to a running average or mean of detected events. For example, the diagnosis module 212 as depicted in FIG. 2 analyzes system data 214 and detects an increase in the fraud detection rate that is greater than a standard deviation away from the 3-month running average fraud detection rate.

Once a change in the results from their existing models has been detected 501, the local node will list all of the models involved in that detection 502. In some embodiments, the local node will list all of the models directly involved with producing the events detected in step 501. In some embodiments, the local node will list all of the models directly and indirectly involved with producing the events detected in step 501. In some embodiments, the local node will list all actively running models when the events were detected in step 501. For example, the diagnosis module 212, with access to both the system data 214 and the current model database 215, will list all of the algorithmic models that were directly and indirectly involved with producing the fraud events that were previously detected in step 501.

Once a local node has listed the models 502 relevant to the detected change 501, the local node will analyze the data involved in producing the events that lead to the detected change 503. In some embodiments, the local node analyzes the system data to determine the features and conditions relevant to the models listed in step 502 in producing the events that were detected in step 501. In some embodiments, the local node analysis can include, but is not limited to, ordinary least squares, penalized regressions, generalized additive models, quantile regressions, logistical regressions, and gated linear models. In some embodiments, the local node analysis will be transformed variants of the relevant model or models that reduce the complexity of those models. For example, placing monotonicity constraints on a non-linear, non-monotonic model to orient the model around variable relationship known to be true, or the utilization of monotonic neural networks for machine learning applications. In some embodiments, the relevant visualizations will be related but less complex models that approximate the applicable model or models, especially machine learning models. For example, surrogate models, local interpretable model-agnostic explanations (LIME), maximum activation analysis, linear regression, and sensitivity analysis.

Once a local node has listed the models 502 and analyzed the relevant data 503, the local node can then generate the features of the model update 504 that will be sent to the rest of the update system. In some embodiments, a diagnostic module of a local node generates the model features 504. In some embodiments, the features of the model update are local node agnostic, i.e., the model update is usable by any of the local nodes in the update system. Therefore, the model update generated by the local node is stripped of any specific data of that local node. In some embodiments, the model update features comprise one or more of the following: one or more algorithms, creation date and time, number of events detected over given time period, metadata or high level aggregate statistics such as total transactional value of time, and the threshold point or points used to trigger the update. In some embodiments, the model update features comprise ratio statistics of one or more data group averages. In some embodiments, the model update can detect deviation from the ratio statistics of one or more data group averages to determine future positive results. In some embodiments, the model update features comprise one or more network or image graphics that represent one or more models. In some embodiments, the model update features comprise one or more network or image graphics that represent the new model.

Once a local node has generated the model features 504, the local node can output the model update 505. In some embodiments, the local node will output the model update to a central module of the update system, which receives the model update 506. For example, the monitoring module 211 of local node 210 can receive a model update from the diagnosis module 212, and then the monitoring module 211 can send the model update to the central module 201, which receives the model update.

Upon receiving a model update from a local node 506, a central module of an update system will then consult a model database 507. In some embodiments, the central module consults a model database to determine if the model update is already present. In some embodiments, the central module consults a model database to determine if the model update replaces an existing model in the database or is a novel model to the database. In some embodiments, when the central module consults a model database and determines that the model update could replace or modify an existing model in the database, the central module can pull model information on the existing model. In some embodiments, model information can include one or more of the following: model creation date and time, date and time of when the model was last updated, and how many local nodes currently use the model. For example, upon receiving the model update from local node 210, the central module 201 checks the model update against the available model database 202. The central module 201 determines if the model update already exists in the available model database 202, and if it does, the central module 201 will pull relevant information on any existing model.

After the central module of an update system consults a model database 507, the central module will then determine the priority level of the model update 508. In some embodiments, the priority level of the model update will be listed as high, medium, or low. In some embodiments, the priority level of the model update will be listed on a numerical scale, for example, between a range of 1 to 10 or other common numerical range. In some embodiments, the central module determines the priority level of the model update by comparing the model update features to a pre-determined scale. In some embodiments, the central module determines the priority level of the model update by comparing the model update features to a model database. In some embodiments, the central module determines the priority level of the model update by comparing the model update features to model information stored in an existing model database. In some embodiments, the comparison of the model update features to the existing model information results in a priority grade, which is then turned into a priority level.

For example, after the central module 201 of update system 200 checks the model update for credit card fraud detection against the available model database 202, the central module 201 determines that a similar model already exists in the database and pulls information on the existing model. The central module 201 then compares the model update features to the existing model information and calculates a priority grade. As a first example, the central module determines that the existing model for credit card fraud detection has not been updated in over a year, that the model update is a direct replacement for the existing model, and that the model update can increase performance of detecting credit card fraud over a range of use conditions. These differences result in a high priority grade, which the central module 201 turns into a high priority level. As a second example, the central module determines that the existing model for credit card fraud detection has been recently updated, and that the model update would only be expected to increase performance of detecting credit card fraud with a large enough user base that only few end users are known to have. These differences result in a relatively lower priority grade, which the central module 201 turns into a medium priority level.

After determining priority, the update system would then determine the applicable end users for the new model 509. In some embodiments, the central module is determining which end users are applicable. In some embodiments, the central module determines which end users are applicable for the model update by comparing the model update features with information on each end user, in addition to the priority information of the new model. For example, if the model update for credit card fraud detection has a medium priority, the central module will identify which local nodes in the update system are involved with credit card fraud detection and then push out the model 510 to those identified local nodes. The model update would not be pushed out to any remaining local nodes, however, when each of those remaining local nodes initiates an update process, for example, if enough time has gone by without an update to trigger the monitoring module, that local node may then receive the update. In another example, if the model update for credit card fraud detection has a high priority, the central module will output the model 510 to all local nodes. In another example, if the model update for credit card fraud detection has a low priority, the central module will not push out the model to any local node right away, and instead wait for each local node to initiate an update process on its own.

Once the model update has been sent out from the central module, it is received by at least one local node 511. In some embodiments, the model update is received by multiple local nodes simultaneously. In some embodiments, the model update is received by the monitoring module in any of the embodiments described herein.

In some embodiments, once a local node has received a model update 511, it is not installed automatically. First, the local node will consult the current model database to see if the model update will replace any existing models 512. Then the local node will determine the relevance of the model update to the node 513. For example, in local node 210 of update system 200 depicted in FIG. 2, the model update is received by the monitoring module 211, and then passed along to the diagnosis module 212. The diagnosis module 212 first consults the current model database 215 and then determines the relevance of the model update to local node 210. In some embodiments, the diagnosis module 212 will end the update process after the determine relevance step 513. In some embodiments, the diagnosis module 212 will end the update process after the determine relevance step 513 if the diagnosis module 212 determines that the model update is not needed for the local node. In some embodiments, the diagnosis module 212 will end the update process after the determine relevance step 513 if the diagnosis module 212 determines that the model update is already present in the local node. In some embodiments, the diagnosis module 212 will automatically bypass the determine relevance step 513 if the model update carries a high priority.

In some embodiments, once the local node has determined that the model update would be relevant or necessary, the local node will determine if it has permission to apply the model update 514. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 516. For example, once the diagnosis module 212 has either determined that the model update is relevant or that the model update has a high enough priority to bypass the determine relevance step 513, the model update is passed along to the evaluation module 213. The evaluation module 213 then checks the update permission settings of the local node. In some embodiments, if the evaluation module 213 determines that it does not have permission to install the model update, the evaluation module 213 will end the update process. In some embodiments, the evaluation module 213 will consult an end user, for example, by issuing a user prompt or by sending an e-mail or other communication to the end user, before installing the model update.

The local node will install the model update once the local node determines that it has permission to do so 515. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation module 213 updates the current model database 215 with the model update.

In some embodiments, once the update 515 is complete, the local node creates an output report 517. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

Figure 6:
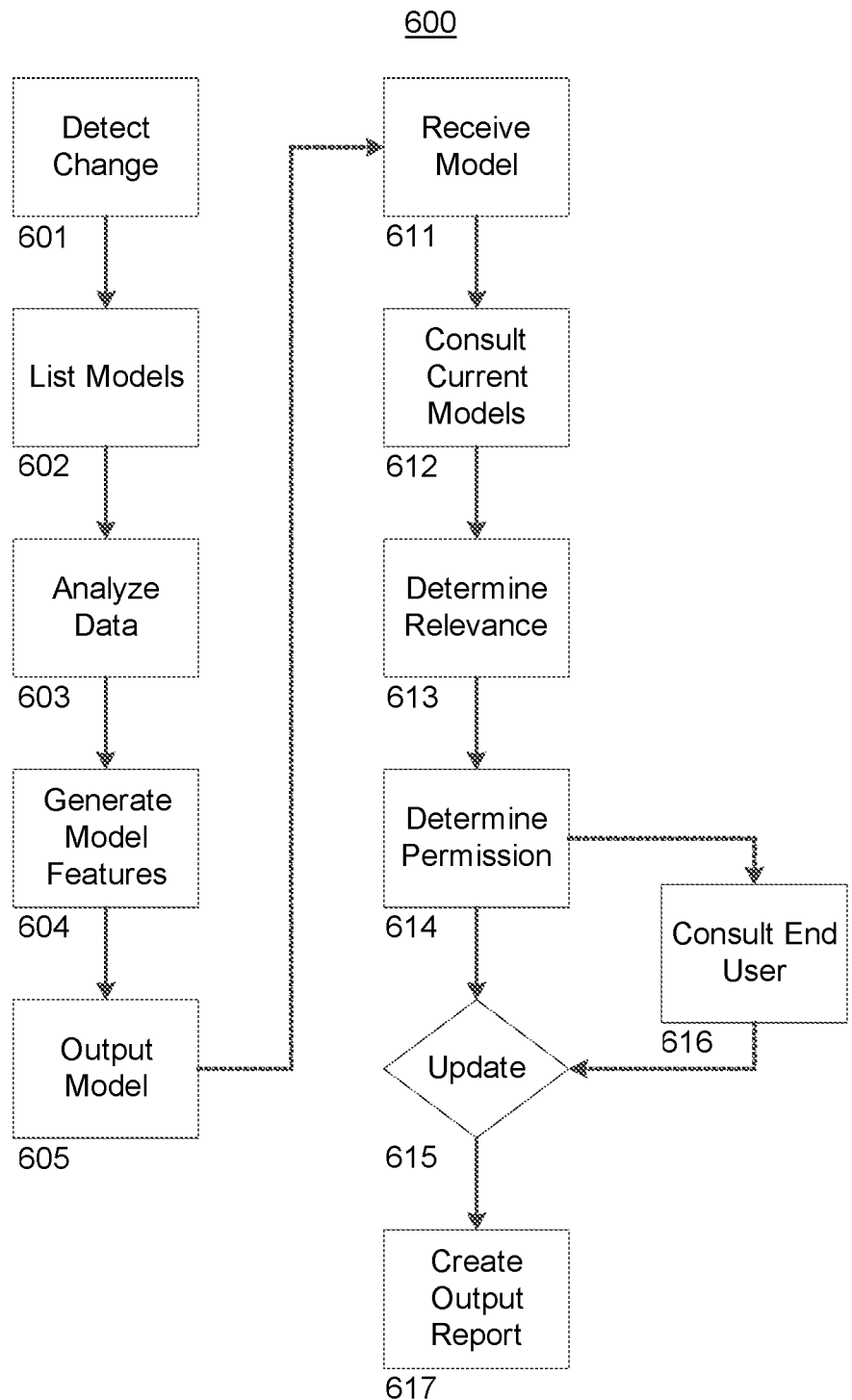
FIG. 6 depicts a flow chart of an exemplary method of updating analytical systems using a model update created by one of the local nodes, wherein the local nodes are directly connected.

FIG. 6 depicts a flow chart of an exemplary method of pushing a model update in an update system without a central module, where the model update was created automatically from a local node in the update system 600. In some embodiments, method 600 can be used with the update system depicted in FIG. 3. First, a local node in an update system will detect a change in the results from their existing models 601. In some embodiments, a local node in an update system will detect a change in fraud detection rates. In some embodiments, the change in fraud detection rates is an increase in fraud detection greater than a pre-set threshold. In some embodiments the change in fraud detection rates is a significant increase or decrease in fraud over a given period of time. In some embodiments, a local node in an update system will detect a change in detected fraud magnitude. In some embodiments, the change in fraud magnitude is an increase in the value or dollar amount of a detected fraud event greater than a pre-set threshold. In some embodiments, the change in fraud magnitude is a significant increase in the value or dollar amount of a detected fraud event compared to a running average or mean of detected events. For example, the diagnosis module 312 as depicted in FIG. 3 analyzes system data 314 and detects an increase in the fraud detection rate that is greater than a standard deviation away from the 3-month running average fraud detection rate.

Once a change in the results from their existing models has been detected 601, the local node will list all of the models involved in that detection 602. In some embodiments, the local node will list all of the models directly involved with producing the events detected in step 601. In some embodiments, the local node will list all of the models directly and indirectly involved with producing the events detected in step 601. In some embodiments, the local node will list all actively running models when the events were detected in step 601. For example, the diagnosis module 312, with access to both the system data 314 and the current model database 315, will list all of the algorithmic models that were directly and indirectly involved with producing the fraud events that were previously detected in step 601.

Once a local node has listed the models 602 relevant to the detected change 601, the local node will analyze the data involved in producing the events that lead to the detected change 603. In some embodiments, the local node analyzes the system data to determine the features and conditions relevant to the models listed in step 602 in producing the events that were detected in step 601. In some embodiments, the local node analysis can include, but is not limited to, ordinary least squares, penalized regressions, generalized additive models, quantile regressions, logistical regressions, and gated linear models. In some embodiments, the local node analysis will be transformed variants of the relevant model or models that reduce the complexity of those models. For example, placing monotonicity constraints on a non-linear, non-monotonic model to orient the model around variable relationship known to be true, or the utilization of monotonic neural networks for machine learning applications. In some embodiments, the relevant visualizations will be related but less complex models that approximate the applicable model or models, especially machine learning models. For example, surrogate models, local interpretable model-agnostic explanations (LIME), maximum activation analysis, linear regression, and sensitivity analysis.

Once a local node has listed the models 602 and analyzed the relevant data 603, the local node can then generate the features of the model update 604 that will be sent to the rest of the update system. In some embodiments, a diagnostic module of a local node generates the model features 604. In some embodiments, the features of the model update are local node agnostic, i.e., the model update is usable by any of the local nodes in the update system. Therefore, the model update generated by the local node is stripped of any specific data of that local node. In some embodiments, the model update features comprise one or more of the following: one or more algorithms, creation date and time, number of events detected over given time period, metadata or high level aggregate statistics such as total transactional value of time, and the threshold point or points used to trigger the update. In some embodiments, the model update features comprise ratio statistics of one or more data group averages. In some embodiments, the model update can detect deviation from the ratio statistics of one or more data group averages to determine future positive results. In some embodiments, the model update features comprise one or more network or image graphics that represent one or more models. In some embodiments, the model update features comprise one or more network or image graphics that represent the new model.

Once a local node has generated the model features 604, the local node can output the model update 605. In some embodiments, the local node will output the model update to at least one other local node of the update system, which receives the model update 611. In some embodiments, the local node will output the model update to all other local nodes of the update system. For example, the monitoring module 311 of local node 310 can receive a model update from the diagnosis module 312, and then the monitoring module 311 can send the model update to the other local node 320, which receives the model update.

In some embodiments, once a local node has received a model update 611, it is not installed automatically. First, the local node will consult the current model database to see if the model update will replace any existing models 612. Then the local node will determine the relevance of the model update to the node 613. For example, in local node 310 of update system 300 depicted in FIG. 3, the model update is received by the monitoring module 311, and then passed along to the diagnosis module 312. The diagnosis module 312 first consults the current models database 315 and then determines the relevance of the model update to local node 310. In some embodiments, the diagnosis module 312 will end the update process after the determine relevance step 613. In some embodiments, the diagnosis module 312 will end the update process after the determine relevance step 613 if the diagnosis module 312 determines that the model update is not needed for the local node. In some embodiments, the diagnosis module 312 will end the update process after the determine relevance step 613 if the diagnosis module 312 determines that the model update is already present in the local node.

In some embodiments, once the local node has determined that the model update would be relevant or necessary, the local node will determine if it has permission to apply the model update 614. In some embodiments, the evaluation module of the local node determines if the local node has permission to apply the model update. In some embodiments, a local node will not have permission to install the model update. In some embodiments, a local node will not have automatic permission to install any model update. In some embodiments, a local node must consult or ask permission from an end user prior to installing the model update 616. For example, once the diagnosis module 312 has determined that the model update is relevant, the model update is passed along to the evaluation module 313. The evaluation module 313 then checks the update permission settings of the local node. In some embodiments, if the evaluation module 313 determines that it does not have permission to install the model update, the evaluation module 313 will end the update process. In some embodiments, the evaluation module 313 will consult an end user, for example, by issuing an user prompt or by sending an e-mail or other communication to the end user, before installing the model update.

The local node will install the model update once the local node determines that it has permission to do so 615. In some embodiments, an evaluation module installs the model update. In some embodiments, any module of the update system installs the model update. In some embodiments, the model update installs one or more new models to a current model database in the local node. In some embodiments, the model update replaces one or more models in a current model database in the local node. For example, after permission has been established, the evaluation model 313 updates the current model database 315 with the model update.

In some embodiments, once the update 615 is complete, the local node creates an output report 617. In some embodiments, the output report is shared with an end user. In some embodiments, the output report is shared with a central module of an update system. In some embodiments, the output report contains information on the model update, including, for example, the type of model updated, whether or not any old models were replaced, the date and time of the update, whether the new model is currently active, or any combination thereof.

In some embodiments, the user of any of the systems disclosed herein can be one or more human users, as known as "human-in-the-loop" systems. In some embodiments, the user of any of the systems disclosed herein can be a computer system, artificial intelligence ("AI"), cognitive or non-cognitive algorithms, and the like.

The above embodiments describe systems and methods for updating detection models based on, for example, the monitoring and analysis of data associated with in-use models and the evolving need for new models as new detectable activities and patterns emerge. There are instances in which detection models used by local nodes can be updated and improved with a more robust data set, such as model results, testing results, etc. Further, a greater data set can be achieved through data sharing, such as which may occur through an agreement or consortium of entities, such as corporations, financial institutions, etc. However, there is a need to maintain data privacy, especially when the data used to generate models is sensitive information, such as personal-identifying information. Further, when sensitive data is transmitted to shared devices, there is often a need (e.g., regulatory requirement) that various aspects of the data flow be recorded, as well as the tracking and recordation of various actions and events that take place in relation to the data, in order to ensure compliance with privacy protections (e.g., local laws and regulations). Disclosed embodiments further provide systems and methods for utilizing a shared data set of information in model generation, while including privacy protections such as by calculating general features that are not traceable back to data.

Figure 7:
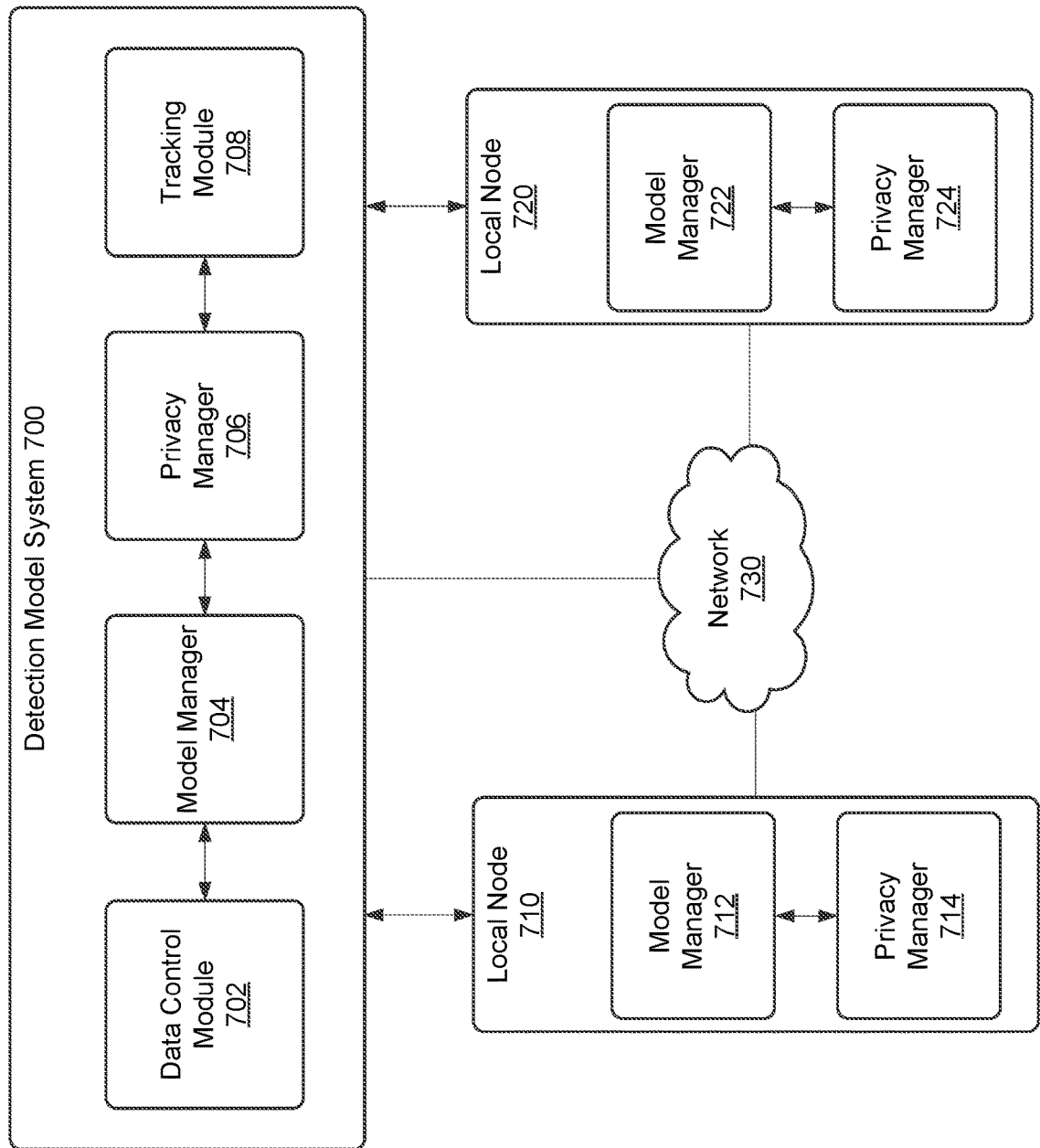
FIG. 7 depicts an exemplary embodiment of a detection model system for maintaining data privacy when generating and sharing models.

FIG. 7 is a diagram of an exemplary system including a detection model system 700, a local node 710, and a local node 720 connected by a network 730. In an exemplary embodiment, the detection model system 700 is a computing system including hardware and software components. The detection model system 700, in some embodiments, is the same as or similar to the central module 201. In other embodiments, the detection model system 700 is a local node, such as local node 310. The local nodes 710, 720 may be end-user devices, such as computing devices associated with entities (e.g., a financial institution). The local nodes 710, 720 may be the same as or similar to the local nodes 100, 210, 220, 310, and/or 320.

The detection model system 700 may include a plurality of modules, embodied in hardware and/or software that provide detection model and privacy protection functionality. In an exemplary embodiment, the detection model system 700 includes a data control module 702, a model manager 704, a privacy manager 706, and a tracking module 708.

The data control module 702 may be configured to receive data from the local nodes 710, 720. In exemplary embodiments, the data may include aggregated feature data that is not customer or transaction data of a single customer but instead describes the contents of a data set including multiple customers and/or transaction. For example, aggregated feature data may include metrics data (e.g., calculated measures of grouped data, such as a counting number of customers or transactions), regional data (statistics regarding where transactions take place), time data (statistics regarding when transactions take place), amount data (e.g., ranges of amounts that occur), etc. The data control module 702 may be configured to control the flow of data to and from the detection model system 700, such as by sending data requests, data transmissions, etc.

The model manager 704 may be configured to manage the generation and deployment of detection models between the detection model system 700 and the local nodes 710, 720. The model manager 704 may include one or more of the components described in one or more of FIGS. 1-3. For example, the model manager 704 may include a monitoring module, diagnosis module, and/or evaluation module for updating detection models based on received data, such as data received by the data control module 702. The model manager 704 may be configured to generate and deploy models to local nodes 710, 720 based on model updates as described herein. In additional or alternative embodiments the model manager 704 may include other components (e.g., additional or alternative modules).

The privacy manager 706 is configured to perform one or more privacy protection functions in the generation and deployment of detection models by the model manager 704. For example, the privacy manager 706 may be configured to monitor data received by the data control module 702 and perform one or more data privacy actions in consideration of protecting the data that is sent to and received by the detection model system 700 (e.g., preventing access of data from local node 710 by local node 720). The data privacy actions may include, for example, encrypting/decrypting data from the data control module 702, deletion of used data, aggregation of data, anonymization of data, tagging of data for tracking and recording, etc.

The tracking module 708 is configured to track a data flow through the detection model system 700 and record one or more events, statistics, and/or data content. The tracking module 708 is configured to perform tracking and recording functions to monitor the receipt and use of data, such as for the purpose of compliance with data privacy protections and regulations.

The local nodes 710, 720 are in communication with the detection model system 700 such that the local nodes 710, 720 supply high-level feature data and/or detection models to the detection model system 700, and, in some instances, to other local nodes. For instance, local node 710 may retrain a model and generate a retraining package to be sent via the network 730 to other nodes, such as local node 720. The retraining package may include instructions for calculating features based on data. In some embodiments, local nodes 710, 720 may supply feature data to the detection model system 700, the detection model system 700 may generate an updated model based on the feature data, and the detection model system 700 may deploy the model to the local nodes 710 and 720 by providing instructions for calculating one or more features. It should be understood that the local nodes 710, 720 are exemplary and that any number of local nodes may be connected to the detection model system 700

(or the detection model system 700 may be a single local node configured to perform one or more disclosed functions).

The local node 710, in some embodiments, may include a model manager 712 and a privacy manager 714. The model manager 712 may be configured to manage the generation and deployment of detection models between the local node 710 and other local nodes (e.g., local node 720) and/or the detection model system 700. In some embodiments, the model manager 712 may include the components described in one or more of FIGS. 1-3. For example, the model manager 712 may include a monitoring module, diagnosis module, and/or evaluation module for updating detection models, such as via one or more processes described in relation to FIGS. 4-6. In additional or alternative embodiments the model manager 712 may include other components (e.g., additional or alternative modules). The model manager 712 may be configured to receive a model deployed from the detection model system 700. In other embodiments, the model manager 712 may be configured to generate an updated detection model, and, for example, deliver the updated detection model to the detection model system 700.

The privacy manager 714 is configured to perform one or more privacy protection functions in the generation and deployment of detection models by the model manager 712. For example, the privacy manager 714 may be configured to monitor data to be sent to the detection model system 700 and perform one or more data privacy actions in consideration of protecting the data that is sent to the detection model system 700. The data privacy actions may include, for example, aggregating data into general features, generation of instructions for calculating the features, encrypting/decrypting data, deletion of used data, anonymization of data, tagging of data for tracking and recording, etc. The local node 720 may similarly include a model manager 722 and a privacy manager 724.

The network 730 may be a local or global network and may include wired and/or wireless components and functionality which enable internal and/or external communication for components of the disclosed system. The network 140 may be embodied by the Internet, provided at least in part via cloud services, and/or may include one or more communication devices or systems which enable data transfer to and from the systems and components of the service provider system 100.

Figure 8:
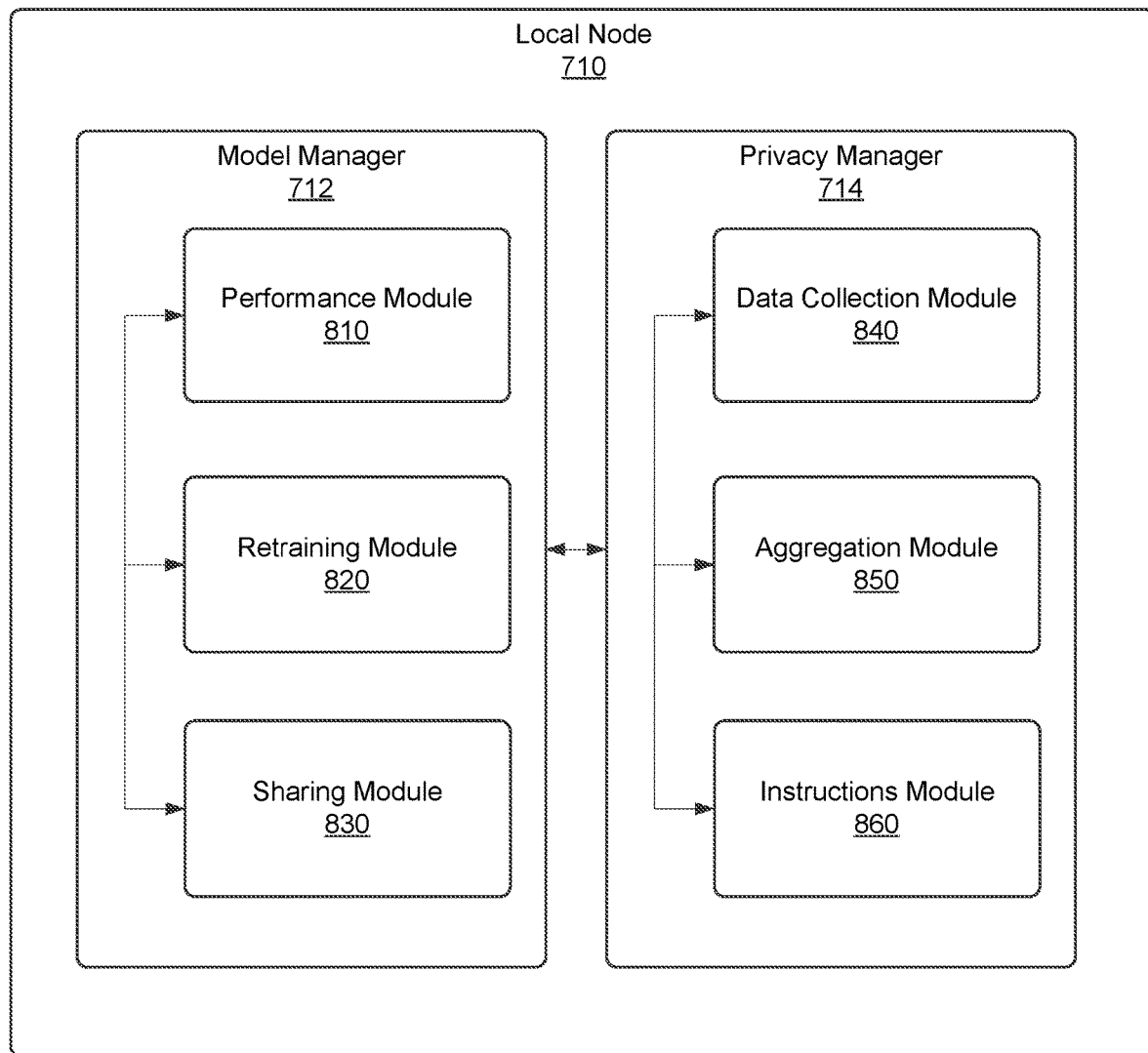
FIG. 8 depicts an exemplary embodiment of a local node that may be used in conjunction with the detection model system of FIG. 7.

FIG. 8 is a block diagram of an exemplary embodiment of the local node 710. In an exemplary embodiment, the local node 710 includes the model manager 712 and the privacy manager 714. The model manager 712 may include, in some embodiments, a performance module 810, a retraining module 820, and an sharing module 830. The privacy manager 714 may include a data collection module 840, an aggregation module 850, and an instructions module 860. The depicted embodiments of the model manager 712 and privacy manager 714 are exemplary and may also describe one or more of model managers 704, 722 and privacy manager 706, 724.

The performance module 810 may be a hardware and/or software component configured to control performance of a detection model, such as a fraud detection model for financial institution data. The performance module 810 may execute a detection model using data, such as transaction and customer data. The performance module 810 may track model performance and provide feedback. For example, the performance module 810 may implement a retrained model, compare calculated features to a threshold, and detect triggered activity alerts. The performance module 810 may provide the alert to a user such as to alert the user to transactions or customers based on a new or retrained detection model.

The retraining module 820 may be a hardware and/or software component configured to retrain a detection model. For example, the retraining module 820 may adjust a detection model to include a replacement or additional process for detecting certain activity based on data, such as detecting suspicious or fraudulent activity. In some embodiments, the retraining module 820 is configured to generate new detection processes based on data from the performance module 810 or other source (e.g., customer or transaction database). For example, the retraining module 820 may receive user input data from a user interface based on a user-generated detection model.

The sharing module 830 may be configured to implement a new detection model or retrained detection model by applying instructions for calculating features from data. For example, the sharing module 830 may receive instructions from another device, such as local node 720 or detection model system 700, and use the instructions to calculate features that are part of a retrained detection model or new detection model.

The data collection module 840 may be configured to collect data from the model manager 712 and/or other source (e.g., a customer or transaction database). The data may include sensitive data such as transaction-level data, identifying data, etc. The data may include information that received and kept private by a financial institution but which is not likely to be shared with other entities.

The aggregation module 850 may be configured to aggregate the data into general features that describe the data but is not traceable or reversible into the sensitive data. Examples of general features include metrics data (e.g., calculated measures of grouped data, such as a counting number of customers or transactions), regional data (statistics regarding where transactions take place), time data (statistics regarding when transactions take place), amount data (e.g., ranges of amounts that occur), etc. The general features from the aggregation module 850 do not include the sensitive data and thus can be shared with other entities without exposing private information.

The instructions module 860 is configured to produce instructions for calculating one or more general features based on data for retraining a detection model. The instructions may include metadata that are attached to a retraining package for implementing a detection model in another local node (e.g., local node 720). For instance, the instructions module 860 may produce an algorithm that uses data to calculate general features or a variable based on a combination of calculated features, but which does not itself include any data. The sharing module 830 may combine the instructions with an algorithm having a threshold for triggering an activity alert when new data is used to calculate selected features and compared to a threshold. The sharing module 830 may transmit the package to another component, such as the local node 720 or the detection model system 700.

Figure 9:
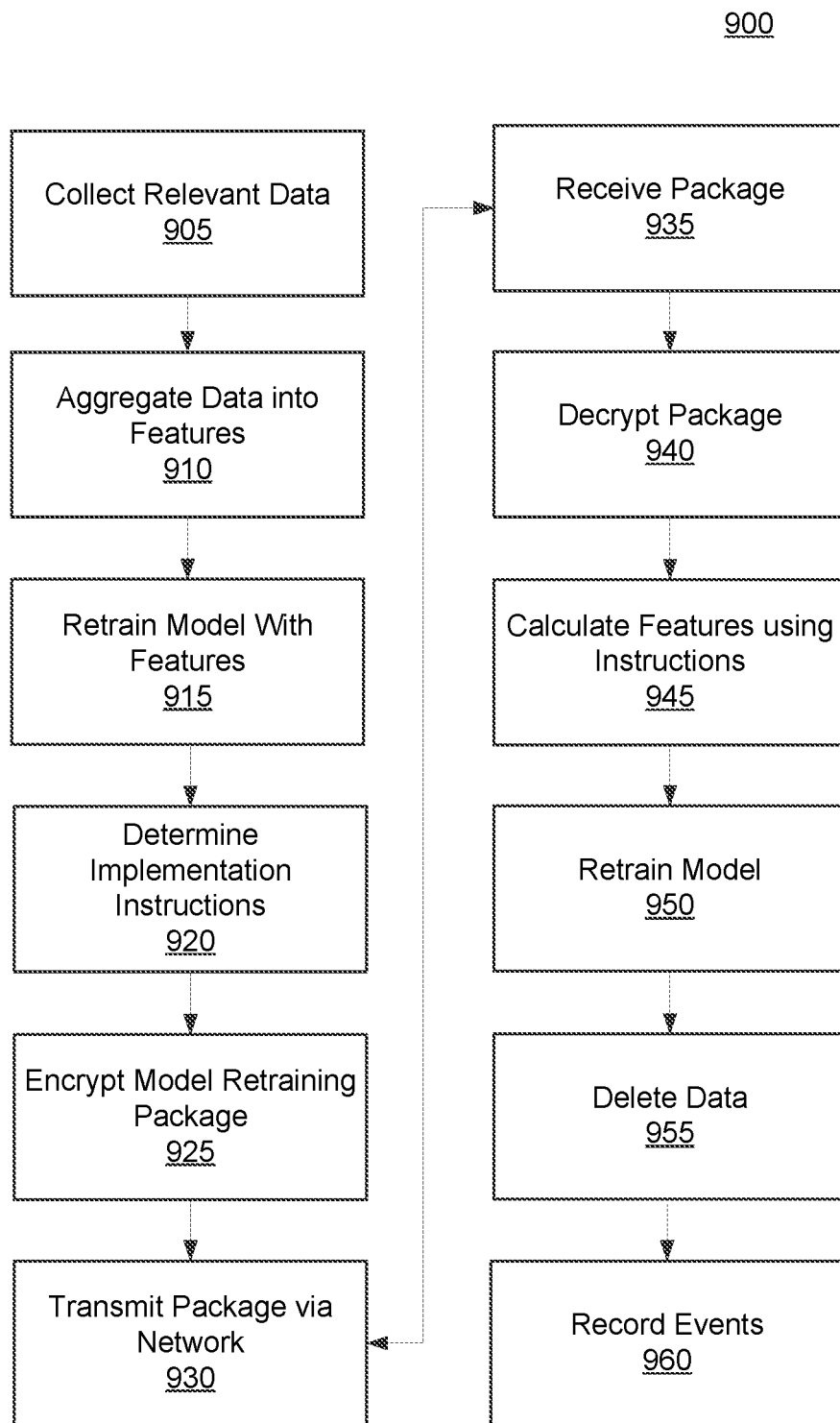
FIG. 9 depicts a flow chart of an exemplary method of retraining models using shared aggregation features while maintaining data privacy through a detection model system.

FIG. 9 is a flow chart of an exemplary process 900 for generating and sharing an updated detection model or model retraining from a data set while maintaining data privacy. In some embodiments, one or more components such as detection model system 700, local node 710, and/or local node 720 may perform one more steps of the process 900. For example, a processor may execute software instructions stored in a data storage device associated with one or more of the devices.

In step 905, the local node 710 may identify relevant data for use in generating updated detection models. For example, the local node 710 may collect data from a deployed model, such as results, testing data, etc. In other embodiments, the local node 710 may collect customer data for use in retraining a deployed model. In some embodiments, the privacy manager 714 may receive the selected data (e.g., at the data collection module 840).

In step 910, the local node 710 may aggregate the data into features. For instance, the aggregation module 850 may use data to create one or more metrics or statistics that describe the contents of the data but which cannot be transformed or reverse engineered into the data itself. In other words, the sensitive customer and transaction data are indeterminable from the features. For instance, the aggregation module 850 may produce statistics regarding the location or timing of transactions, the types of customers that complete certain transactions, the result of transaction, the types of transactions that turn out to be fraudulent, etc. A feature may be, for example, an average purchase amount of $35 on Wednesdays, while the actual data itself may be the customer identifiers and transaction details regarding those purchases. The feature is aggregated and general to describe the contents of the data, but cannot be used to precisely determine the actual data. The general features thus do not include data and provide a layer of privacy from the actual sensitive data.

In step 915, the local node 710 may retrain a model using the aggregated features. For instance, a user may provide an algorithm that uses the features to compare a variable to an acceptable range for flagging transactions or groups of transactions that satisfy certain criteria. In some embodiments, the retraining module 820 may add the algorithm to a detection model as an improved means for detecting certain behavior in data. The performance module 810 may use the retrained model to detect that behavior in customer data.

In step 920, the local node 710 may determine implementation instructions for calculating features needed for the retrained model (e.g., for using data to determine elements of an algorithm added through the retraining). The instructions may include calculations and/or variables such as average amount in a regional area, customer number over age 65, etc. to determine features from data. The instructions may also include a decision portion for use in triggering the detection of an event. For instance, if a number of transaction in a regional area exceed a threshold value, trigger a suspicious activity alert. The instructions thus tell a module how to use its own data to perform a detection process.

In step 925, the local node 710 may encrypt the calculated features and/or instructions as a retraining package for sharing. For example, the instructions module 860 may use an encryption algorithm to add an additional privacy layer for data to be shared, such as the features and/or instructions. In step 930, the local node 710 may transmit the encrypted retraining package via the network 730, to another local node (e.g., local node 720) or the detection model system 700.

In step 935, the local node 720 receives a retraining package from local node 710, either directly or via detection model system 700. In step 940, the local node 720 may decrypt the received package. For example, the privacy manager 706 may use a decryption algorithm to convert the encrypted package to obtain the features and/or instructions associated with the retraining of the detection model.

In step 945, the local node 720 is configured to calculate features using the decrypted instructions. For instance, the local node 720 is configured to use an algorithm with data (e.g., sensitive customer and/or transaction data) as an input and one or more general features as an output. In step 950, the local node 720 is configured to retrain a model using the calculated features and the decrypted package. For example, the local node 720 may retrain a detection model to include a comparison of one or more calculated features to a threshold. The retrained model thus includes an additional detection component based on features from another local node, without the sharing of data.

In step 955, the local node 720 deletes used data. For example, the privacy manager 724 may utilize a data deletion scheme in order to delete received features after it has been used to retrain a model. For example, the privacy manager 706 may use a deletion timer to set an expiration for data. The expiration may be a formatted on a rolling basis in order to maintain a certain data set size while the data itself changes as it is received from local nodes. In some embodiments, the privacy manager 724 may delete metadata instructions associated with the features. In some embodiments, the deletion step may occur in conjunction with an encryption/decryption step. For instance, data may be decrypted, anonymized, and deleted in a single processing loop to minimize the exposure of data or features and provide an additional layer of privacy.

In step 960, the local node 720 is configured to record events associated with the model generation and deployment process. For example, local node 720 may provide retraining data to the detection model system 700 for keeping track of nodes that have retrained models. For instance, the tracking module 708 may use metadata associated with received data to record events associated with the model retraining process. For example, the tracking module 708 may collect and store information associated with data receipt, usage, encryption, decryption, deletion, etc. The tracking module 708 may store a model record associated with each process that results in the creation and deployment of a detection model update.

In the process 900, the disclosed systems and components are configured to utilize a combined data set in a detection model updating scheme while implementing data privacy protections that enable the use of the combined data set. For example, an entity consortium agreement may implement a system to be used as the detection model system for collecting data, performing privacy protection actions such as aggregation into features, generation of instructions for calculating features, encryption, deletion, and tracking, and recording events and content in records for use in auditing, compliance, etc.

In some embodiments, the detection model system 700 may receive the data aggregated in step 910 from multiple local nodes (e.g., local nodes 710 and 720). For example, the local nodes 710, 720 may use instructions (e.g., from the detection model system 700) to calculate model features and provide the features back to the detection model system 700. The detection model system 700 may use the plurality of aggregated features from multiple local nodes to update a detection model or produce a new detection model (steps 915-925). The detection model system may subsequently deploy the new detection model package to multiple local nodes (e.g., local nodes 710, 720). The local nodes 710, 720 may receive the package and perform steps 935-960 to implement the retrained or new model. In this embodiment, the detection model system 700 collects aggregated features from multiple sources and uses the combined data as a more robust source for retraining models. For example, the detection model system 700 may use aggregated data from one local node to confirm or validate detection algorithms from another local node. In another example, the features from multiple nodes may be re-aggregated into a higher level of abstraction (e.g., features that describe the features) to form new models and/or retrain models. For instance, the detection model system 700 may use values for features from multiple local nodes to determine a metric that is used to retrain a detection model, where the metric is determined from the values for the features. Instructions for determining the metric may be delivered to the local nodes and used to trigger alerts when determined values for the metric exceed a threshold, for example.

Figure 10:
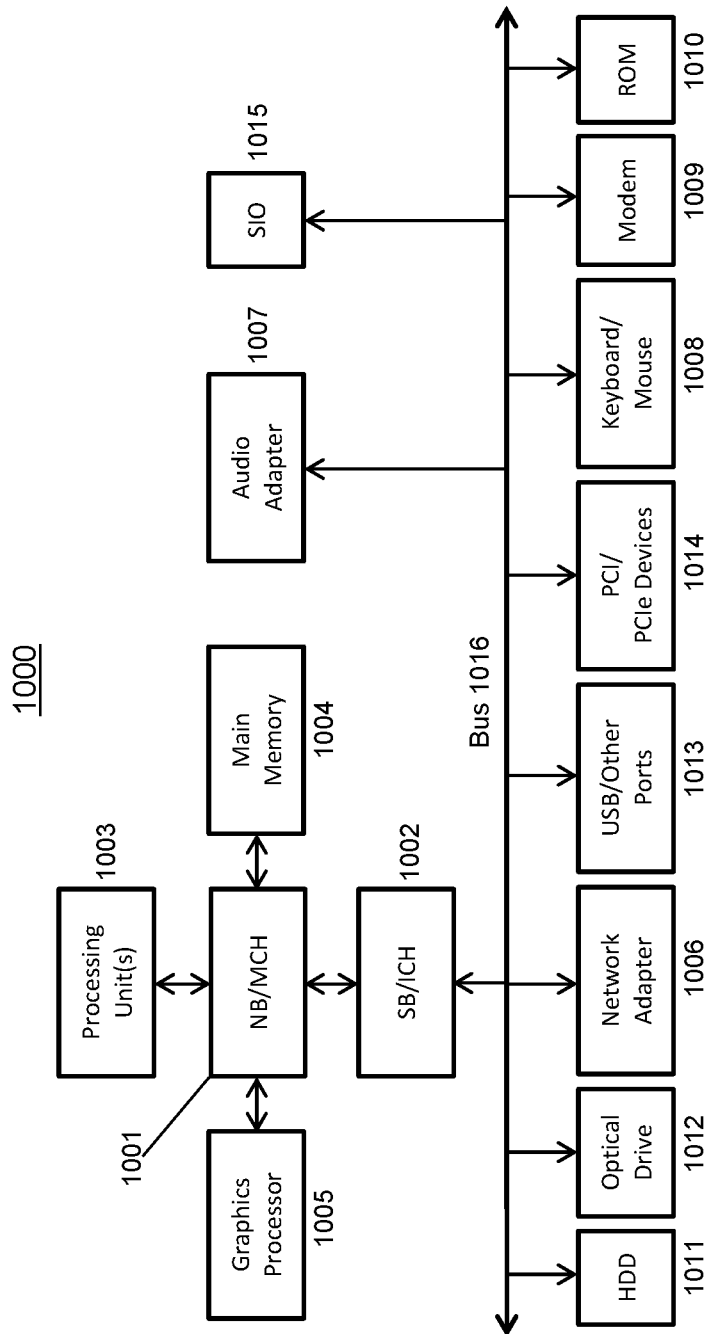
FIG. 10 depicts a block diagram of an example data processing system in which aspect of the illustrative embodiments may be implemented.

FIG. 10 is a block diagram of an example data processing system 1000 in which aspects of the illustrative embodiments are implemented. Data processing system 1000 is an example of a computer in which computer usable code or instructions implementing the process for illustrative embodiments of the present invention are located. In one embodiment, FIG. 10 represents the entity resolution system 110, which implements at least some of the aspects of the service provider system 100 described herein.

In the depicted example, data processing system 1000 can employ a hub architecture including a north bridge and memory controller hub (NB/MCH) 1001 and south bridge and input/output (I/O) controller hub (SB/ICH) 1002. Processing unit 1003, main memory 1004, and graphics processor 1005 can be connected to the NB/MCH 1001. Graphics processor 1005 can be connected to the NB/MCH 1001 through an accelerated graphics port (AGP).

In the depicted example, the network adapter 1006 connects to the SB/ICH 1002. The audio adapter 1007, keyboard and mouse adapter 1008, modem 1009, read only memory (ROM) 1010, hard disk drive (HDD) 1011, optical drive (CD or DVD) 1012, universal serial bus (USB) ports and other communication ports 1013, and the PCI/PCIe devices 1014 can connect to the SB/ICH 1002 through bus system 1016. PCI/PCIe devices 1014 may include Ethernet adapters, add-in cards, and PC cards for notebook computers. ROM 1010 may be, for example, a flash basic input/output system (BIOS). The HDD 1011 and optical drive 1012 can use an integrated drive electronics (IDE) or serial advanced technology attachment (SATA) interface. The super I/O (SIO) device 1015 can be connected to the SB/ICH 1002.

An operating system can run on processing unit 1003. The operating system can coordinate and provide control of various components within the data processing system 1000. As a client, the operating system can be a commercially available operating system. An object-oriented programming system, such as the Java™ programming system, may run in conjunction with the operating system and provide calls to the operating system from the object-oriented programs or applications executing on the data processing system 1000. As a server, the data processing system 1000 can be an IBM® eServer™ System p® running the Advanced Interactive Executive operating system or the LINUX® operating system. The data processing system 1000 can be a symmetric multiprocessor (SMP) system that can include a plurality of processors in the processing unit 1003. Alternatively, a single processor system may be employed.

Instructions for the operating system, the object-oriented programming system, and applications or programs are located on storage devices, such as the HDD 1011, and are loaded into the main memory 1004 for execution by the processing unit 1003. The processes for embodiments of the web site navigation system can be performed by the processing unit 1003 using computer usable program code, which can be located in a memory such as, for example, main memory 1004, ROM 1010, or in one or more peripheral devices.

A bus system 1016 can be comprised of one or more busses. The bus system 1016 can be implemented using any type of communication fabric or architecture that can provide for a transfer of data between different components or devices attached to the fabric or architecture. A communication unit such as the modem 1009 or network adapter 1006 can include one or more devices that can be used to transmit and receive data.

Those of ordinary skill in the art will appreciate that the hardware depicted in FIG. 10 may vary depending on the implementation. For example, the data processing system 1000 includes several components which would not be directly included in some embodiments of the disclosed systems. However, it should be understood that a disclosed system may include one or more of the components and configurations of the data processing system 1000 for performing processing methods and steps in accordance with the disclosed embodiments.

Other internal hardware or peripheral devices, such as flash memory, equivalent non-volatile memory, or optical disk drives may be used in addition to or in place of the hardware depicted. Moreover, the data processing system 1000 can take the form of any of a number of different data processing systems, including but not limited to, client computing devices, server computing devices, tablet computers, laptop computers, telephone or other communication devices, personal digital assistants, and the like. Essentially, data processing system 1000 can be any known or later developed data processing system without architectural limitation Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for updating a detection model while maintaining data protection in a data processing system comprising a processing device and a memory comprising instructions which are executed by the processing device, the method comprising:
 aggregating, by the processing device, a collection of data into features that describe the contents of the data;
 generating, by the processing device, a detection model using the features by implementing an algorithm that includes at least one selected feature and a threshold for triggering an activity alert;
 determining, by the processing device, instructions for calculating the at least one selected feature from a different collection of data;
 generating, by the processing device, a package having the instructions for calculating the at least one selected feature from the different collection of data and the threshold; and
 transmitting the package to a local node for implementation of the detection model with data stored at the local node.

2. The method of claim 1, wherein the collection of data comprises customer data and transaction data.

3. The method of claim 2, wherein the features are aggregated such that the features do not include customer data or transaction data.

4. The method of claim 1, wherein the features comprise one or more of counting statistics, regional statistics, time statistics, or amount statistics.

5. The method of claim 1, wherein the generating the detection model comprises retraining an existing detection model.

6. The method of claim 1, further comprising encrypting the package prior to transmitting the package to the local node.

7. The method of claim 1, wherein the package is transmitted indirectly to the second node via a detection model system having a tracking module.

8. The method of claim 7, wherein the package further comprises the aggregated features that describe the contents of the data.

9. A local node comprising a processing device and a memory comprising instructions which are executed by the processing device for retraining a model based on a data set comprising data, the local node further comprising:
 an aggregation module configured to aggregate the data into features that describe the contents of the data;
 a retraining module configured to retrain a detection model using the features by implementing an algorithm that includes at least one selected feature and a threshold for triggering an activity alert;
 an instructions module configured to determine instructions for calculating the at least one selected feature from a different collection of data; and
 a sharing module configured to:
  generate a package having the instructions for calculating the at least one selected feature from the different collection of data and the threshold, and
  transmit the package to a local node for implementation of the retrained detection model with data stored at the local node.

10. The local node of claim 9, wherein the collection of data comprises customer data and transaction data.

11. The local node of claim 10, wherein the features are aggregated such that the features do not include customer data or transaction data.

12. The local node of claim 9, wherein the features comprise one or more of counting statistics, regional statistics, time statistics, or amount statistics.

13. The local node of claim 9, further comprising encrypting the package prior to transmitting the package to the local node.

14. The local node of claim 9, wherein the package is transmitted indirectly to the second node via a detection model system having a tracking module.

15. The local node of claim 14, wherein the package further comprises the aggregated features that describe the contents of the data.

16. The local node of claim 9, further comprising a performance module for monitoring the retrained model and detecting triggered activity alerts.

17. A computer-implemented method for updating a detection model while maintaining data protection in a data processing system comprising a processing device and a memory comprising instructions which are executed by the processing device, the method comprising:
 receiving features from a plurality of local nodes, the features being aggregated data that describe the contents of the data relevant to a respective local node;
 generating, by the processing device, a detection model based on the received features from the plurality of local nodes, the detection model comprising a threshold for comparing to at least one selected feature or combination of features and triggering an activity alert;
 determining, by the processing device, instructions for calculating the at least one selected feature or combination of features from a different collection of data;
 generating, by the processing device, a package having the instructions for calculating the at least one selected feature from the different collection of data and the threshold; and
 transmitting the package to each of the plurality of local nodes for implementation of the detection model with data stored at the local node.

18. The method of claim 17, wherein the features are aggregated such that the features do not include customer data or transaction data of an individual customer.

19. The method of claim 17, wherein the features comprise one or more of counting statistics, regional statistics, time statistics, or amount statistics.

20. The method of claim 17, wherein the generating the detection model comprises retraining an existing detection model.

21. The method of claim 17, further comprising encrypting the package prior to transmitting the package to the plurality of local nodes.

22. The method of claim 17, further comprising deleting the features after transmitting the package to the plurality of local nodes.

23. The method of claim 22, further comprising recording one or more events associated with the generation of the detection model prior to deletion of the features.

24. A detection model system comprising a processing device and a memory comprising instructions which are executed by the processing device for retraining a detection model, the detection model system further comprising:

a data control module configured to receive features from at least one local node, the features being aggregated data that describe the contents of the data relevant to a respective local node;

a model manager configured to generate a detection model based on the received features from the plurality of local nodes, the detection model comprising a threshold for comparing to at least one selected feature or combination of features and triggering an activity alert; and a privacy manager configured to determine instructions for calculating the at least one selected feature or combination of features from a different collection of data, wherein the model manager is further configured to:
generate a package having the instructions for calculating the at least one selected feature from the different collection of data and the threshold; and
transmit the package to each of the plurality of local nodes for implementation of the detection model with data stored at the local node.

25. The detection model system of claim 24, wherein the data control module receives features from a plurality of local nodes, the features describing the contents of different sets of data.

* * * * *